July 10, 1962
W. MANDLER
3,043,190
LIGHTING ARRANGEMENT FOR PROJECTOR
Filed Aug. 1, 1958
2 Sheets-Sheet 1
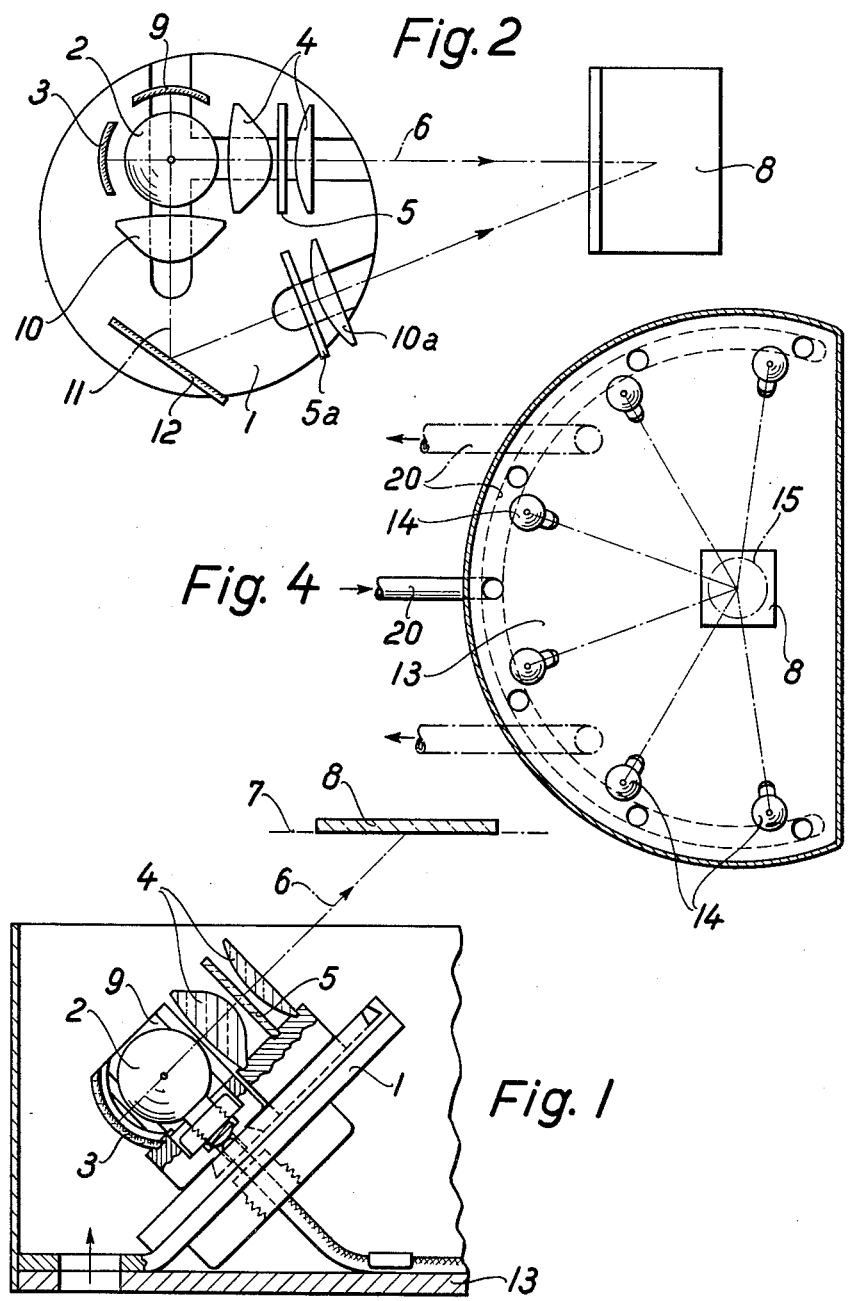
INVENTOR.
WALTER MANDLER
BY Toulmin & Toulmin
ATTORNEYS July 10, 1962  W. MANDLER  3,043,190
LIGHTING ARRANGEMENT FOR PROJECTOR
Filed Aug. 1, 1958  2 Sheets-Sheet 2

INVENTOR.
WALTER MANDLER
BY Toulmin & Toulmin
ATTORNEYS

the lines 4—4 of FIGURE 3 showing the arrangement of a plurality of lighting systems in the reading device.

3,043,190
LIGHTING ARRANGEMENT FOR PROJECTOR

Walter Mandler, Midland, Ontario, Canada, assignor, by mesne assignments, to Gretag Aktiengesellschaft, Regensdorf-Zurich, Switzerland
Filed Aug. 1, 1958, Ser. No. 752,655
3 Claims. (Cl. 88—24)

The present invention relates to a lighting arrangement for a projector, more particularly to a top light arrangement for an episcopic type projector and comprising a light source, a rear mirror and a condensing lens, for reflecting projectors, reading devices such as for microfilm, and the like.

It is frequently desired to use a projector in a room which is fully illuminated for normal use. In such instances, it is necessary that the brightness and intensity of the light on the viewing screen be as rich as possible to provide contrast on the viewing screen in spite of the presence of the normal room illumination.

Lighting arrangements have already been proposed for use in projectors in rooms which are normally illuminated, wherein the rear mirror is bigger than in the conventional arrangement so that the rays reflected on the outer annular zone of said mirror are directed onto the screen by means of an additional annular mirror and annular condensing lens. The axis of the additional annular mirror and annular condenser coincides with the axis of the direct beam of light rays. The use of the annular condenser, however, leads to a lens aberration known as astigmatism. This aberration results in an uneven distribution of light on the image and consequently to an irregular illumination of the screen. Accordingly, this arrangement for increasing the intensity of light has not been satisfactory.

The above-mentioned disadvantage is overcome by the arrangement of the present invention, which is directed to a projector having the conventional arrangement of a rear mirror, condensing lens, and light source. The arrangement specifically comprises at least one additional rear mirror positioned laterally with respect to the light source and an additional condensing lens on the other side of the light source in line with the axis formed by the mirror and the light source. A plane mirror is provided which reflects the light rays received from the condensing lens onto the same screen which is illuminated by the conventional arrangement of rear mirror, condensing lens, and light source which is a direct lighting system. These additional components of the condenser, reflecting mirror, and plane mirror comprise a supplementary lighting system which together with the direct lighting system results in increased intensity of illumination of the screen and an even distribution of light over the illuminated area of the screen.

It is therefore the principal object of this invention to provide a lighting arrangement for a projector and the like wherein increased intensity of illumination on the screen is possible together with an even and regular distribution of light over the screen.

Other objects and advantages of this invention will become apparent upon reference to the accompanying description when taken in conjunction with the following drawings wherein:

FIGURE 1 is a side elevational view of the lighting arrangement of this invention;

FIGURE 2 is a top plan view of the lighting arrangement as illustrated in FIGURE 1 looking in the direction of the arrow A shown in FIGURE 1;

FIGURE 4 is a schematic sectional view taken along the lines 4—4 of FIGURE 3 showing the arrangement of a plurality of lighting systems in the reading device.

Figure 3:
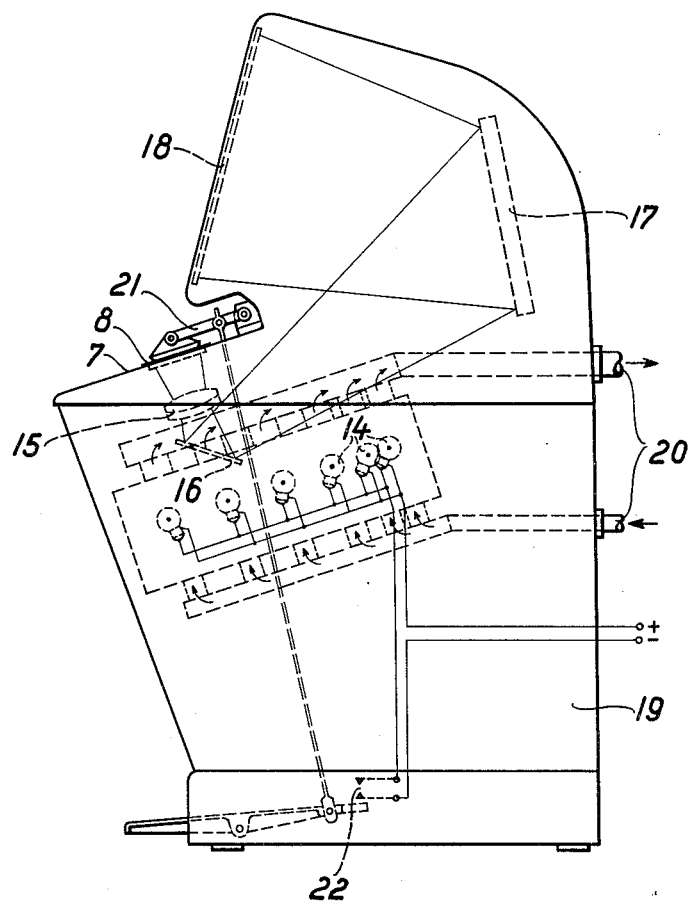
FIGURE 3 is a schematic elevational view of a reading device utilizing episcopic projection and embodying the lighting arrangement of this invention.

For a description of a specific embodiment of this invention, reference is made to FIGURE 1 wherein like reference symbols indicate the same parts throughout the various views and 1 shows a carrier upon which is mounted a light source 2 with a spherical mirror 3 being provided behind the light source. In front of the light source and in line with the mirror and the light source is a condensing lens 4 comprising two axially spaced lenses. There is a heat-absorbing filter 5 between the spaced lenses of the condensing lens. The aforementioned parts from 2 to 5 comprise a direct lighting system whose optical axis is indicated at 6. The optical axis which is indicated at 6 is inclined with respect to a screen 8 which provides a plane for the image 7.

The supplementary lighting system which comprises this invention is formed by mounting a spherical rear mirror 9 behind the light source 2 and spaced laterally from the rear mirror 3.

The rear mirror 9 and the light source 2 form an axis indicated at 11 upon which is mounted a condensing lens 10. The axis 11 is perpendicular to the optical axis 6 of the direct lighting system.

The light rays from the supplementary lighting system are reflected by a plane mirror 12 onto the screen 8. Another condensing lens 10a and a heat-absorbing filter 5a are interposed in the path of the light rays emitted from the supplementary lighting system between the plane mirror 12 and the screen 8. Both the condensing lens 10a and the heat-absorbing filter 5a can also be placed in front of the plane mirror 12, that is, between the light source and the plane mirror. If the condensing lens 10a were arranged in front of the plane mirror, the distance of the light rays from the supplementary lighting system to the screen would not equal that of the light rays from the direct lighting system and, as a result, light source images of different sizes are produced on the screen.

All of the optical parts as described above are mounted on the carrier 1. The carrier 1 in turn is mounted upon a disk 13 upon which may be mounted additional light sources 14 and accompanying parts to form additional direct lighting systems. As is illustrated in FIGURES 3 and 4, the light sources 14 are arranged annularly in a semicircle around the screen 8 and the objective 15 and below the plane of the screen. While the supplementary lighting systems are not shown in this view, it is to be understood that at least one supplementary lighting system would be added to each of the light sources 14 as shown in FIGURE 4. References to FIGURE 3 will reveal that the image-forming light rays are reflected by the mirrors 16 and 17 to reach the viewing screen 18. The screen and mirrors are secured in a housing indicated at 19.

The light sources are cooled by air or other cool gases circulated through the cooling conduits indicated at 20.

A cover plate may be provided for the image 7 so as to be operated by a foot switch indicated at 21. The light sources can be switched on by means of contacts 22 which are actuated by movement of the foot switch 21.

If more than one supplementary lighting system is used, the axes of all of such supplementary lighting systems (which axes are indicated at 11) pertaining to a single lighting system are preferably provided in a single plane which is perpendicular to the optical axis of the direct lighting system as indicated at 6. Further, the axes 11 of the supplementary systems should preferably be at right angles with respect to each other within the range between the light source and the deflecting mirrors.

The above-described structure is preferably used in episcopic projectors, particularly in those projectors where the objects to be projected exhibit a very evenly distributed reflection. The inclination of the angle of incidence of the illuminating rays upon the object must be so chosen that no light regularly reflected by the object will enter the projection objective, but on the other hand, the angle should be close to an angle of 90° so as to achieve maximum intensity of illumination. It is desired that the angle of illumination be as small as possible. In those known lighting devices in which the aperture is enlarged by an annular condensing lens for the purpose of increasing the total illumination, the light source must be positioned so that the illuminating rays are sufficiently far from the limiting angle so that no reflection of the rays into the objective will take place indeed. Such a position is undesirable and can be avoided in the present invention because of the particular arrangement of the reflecting mirrors and condensing lens.

For this reason the supplementary light systems are so provided that their light rays are projected onto the object to be illuminated under the same or smaller angles of incidence than those of the direct lighting system. If necessary, the paths of the light rays from the supplementary systems are in planes of incidence other than that in which the optical axis of the direct lighting system is disposed.

In order to obtain equal images of the light source from both the direct and supplementary paths of light rays, the paths of light rays between the illuminating lenses must be parallel. That is to say, the image of the light source must be at infinity with respect to the first lens of each pair of condensing lens.

As noted with respect to FIGURES 3 and 4, the combined lighting systems comprising both the direct and supplementary lighting systems can be mounted upon a common carrier. Also, these lighting systems may be positioned in an annular lighting arrangement.

Thus it can be seen that the present invention discloses a lighting arrangement for reflecting projectors and the like wherein increased intensity of illumination of the objective is achieved while at the same time eliminating any irregularity of light distribution on the objective.

It will be understood that this invention is susceptible to modification in order to adapt it to different usages and conditions, and, accordingly, it is desired to comprehend such modifications within this invention as may fall within the scope of the appended claims.

What is claimed is:

1. In a lighting arrangement for a projector having an object plane the combintion of a light source, a first condensing lens system in the path of light from said light source, a spherical reflecting surface behind said light source on the optical axis of said first lens system, and a supplementary lighting system including a second condensing lens system and a second spherical reflecting surface positioned also behind said light source laterally with respect to said first surface, said second lens system including a first and a second lens of inclined intersecting optical axes and a mirror interposed at the intersection of said axes, said axes and the axis of said first system defining a common plane, the light rays between said first lens and said mirror, and said mirror and said second lens being parallel, said two lens systems focussing similar beams of said light source on said object plane at the point of intersection of said axis of said first system and the axis of said second lens.

2. In a lighting arrangement for an episcopic projector having an object plane, an objective lens system with an optical axis aligned therewith, the combination of a plurality of light projecting means, each comprising a light source, a first condensing lens system in the path of light from said light source, a spherical reflecting surface behind said light source on the optical axis of said first lens system, and a supplementary lighting system including a second condensing lens system and a second spherical reflecting surface positioned also behind said light source laterally with respect to said first surface, said second lens system including a first and a second lens of inclined intersecting optical axes and a mirror interposed at the intersection of said axes, said two light systems focussing similar beams of said light source at the point of intersecting of said axis of said first system and the axis of said second lens, said plurality of light projecting means being arranged in a semi-circle below the object plane and spaced radially from said optical axis of said objective.

3. In a lighting arrangement for an episcopic projector having an object plane, an objective lens system with an optical axis aligned therewith, the combination of a plurality of light projecting means, each comprising a light source, a first condensing lens system in the path of light from said light source, a spherical reflecting surface behind said light source on the optical axis of said first lens system, and a supplementary lighting system including a second condensing lens system and a second spherical reflecting surface positioned also behind said light source laterally with respect to said first surface, said second lens system including a first and a second lens of inclined intersecting optical axes and a mirror interposed at the intersection of said axes, said axes and the axis of said first system defining a common plane, the light rays between said first lens and said mirror, and said mirror and said second lens being parallel, said two light systems focussing similar beams of said light source at the point of intersection of said axis of said first system and the axis of said second lens, said plurality of light projecting means being arranged in a semi-circle below the object plane and spaced radially from said optical axis of said objective.

References Cited in the file of this patent

UNITED STATES PATENTS

| | | |
|---|---|---|
| 1,788,808 | Stein | Jan. 13, 1931 |
| 1,887,650 | Larner et al. | Nov. 15, 1932 |
| 2,022,366 | Boecking | Nov. 26, 1935 |
| 2,215,203 | Young | Sept. 17, 1940 |

FOREIGN PATENTS

| | | |
|---|---|---|
| 310,967 | Great Britain | May 15, 1930 |
| 502,160 | Great Britain | June 5, 1937 |
| 766,776 | Great Britain | Jan. 23, 1957 |
| 771,613 | Great Britain | Apr. 3, 1957 |
| 781,890 | France | Mar. 4, 1935 |